Oct. 21, 1924.

L. R. BEHNKE

PISTON RING

Filed March 26, 1924

1,512,393

Inventor

Leo R. Behnke.

By

Attorney

Patented Oct. 21, 1924.

1,512,393

UNITED STATES PATENT OFFICE.

LEO R. BEHNKE, OF DULUTH, MINNESOTA.

PISTON RING.

Application filed March 26, 1924. Serial No. 702,130.

*To all whom it may concern:*

Be it known that I, LEO R. BEHNKE, residing at Duluth, in the county of St. Louis and State of Minnesota, a citizen of the United States, have invented certain new and useful Improvements in Piston Rings, of which the following is a specification, reference being had to the accompanying drawing, forming a part thereof.

My invention relates to piston rings such as are commonly carried in annular grooves, formed to receive them in pistons of internal combustion engines, for the purpose of preventing leakage of gases between the piston and the cylinder. The piston rings are usually formed by cutting off a section of a hollow cylinder, severing it at one point and so forming the ends that one will slide within the other when compressed slightly.

My invention has for its object to provide an interlocking joint for the severed ends which will be gas tight and in which the ends of the ring forming the necessary joint may be readily formed to the necessary shapes and at relatively small expense.

Referring to the drawings.

Figure 1:
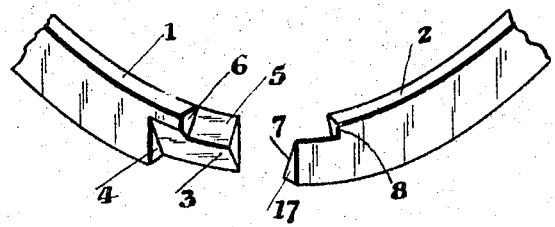
Figure 1 is a perspective view of the joint portions of a piston ring embodying my invention, the ends being shown widely separated for the purpose of showing the construction more clearly.
Figure 2:
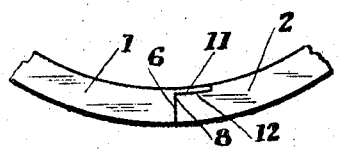
Figure 2 is a top plan view of the joint portion of a ring as shown in Figure 1.
Figure 3:
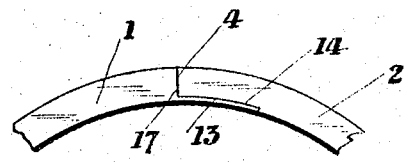
Figure 3 is a bottom plan view of my joint portion as shown in Figure 2.
Figure 4:
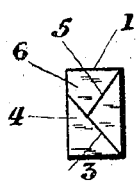
Figure 4 is an end view of the left portion of my piston ring.
Figure 5:
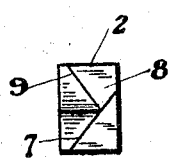
Figure 5 is an end view of the right portion of my piston ring.
Figure 6:
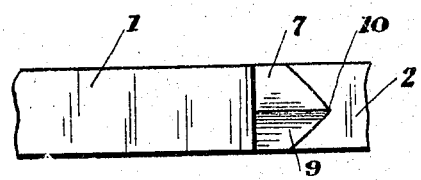
Figure 6 is a rear view showing the joint pressed together.

In the drawings 1 indicates one end of the ordinary piston ring and may, for convenience, be termed the tenon or entrant, and 2 indicates the other end of the ring which may be termed, for convenience, the mortised or receiving end. The body of the piston ring is of the usual construction, that is, in one piece of solid construction finished to the required depth and thickness.

The tenon or entrant end 1 of the piston ring is formed by milling or otherwise cutting away the outer face, beginning at the lower inside edge and extending outwardly at an angle of about 60° and continuing to a point on the outer face about midway of the center of the ring and the top surface, forming a face 3 which extends backward a substantial distance to the point 4. The face 5 is formed by milling or otherwise cutting away the outer face, beginning at the top inner edge and extending outwardly at about the same angle as the face 3, or 60°, and continuing to a line which intersects the angular face 3 about midway of the piston ring, forming a triangle with respect to the face 3 and the inner face of the piston ring. This face 5 extends backwardly from the extreme end of the joint to a point 6 about midway between the extreme end of the joint and the point 4.

The mortised or receiving end 2 of the piston ring is formed by milling or otherwise cutting the inner face, beginning at the lower inner edge of the piston ring and extending outwardly at an angle of about 60° to a line approximately midway between the center of the ring and the top of the piston ring, forming a face 7 extending backwardly a short distance to a point 8. The face 9 is formed by running the miller or otherwise cutting the inner face of the piston ring on an angle of about 60°, beginning at the point 8, and a trifle inside the upper inner edge, and in a direction around the ring for a substantial distance and then gradually bearing towards the inner face until it meets with said inner face as at 10. The lower face 7 is formed the same way beyond the point 8 and carried along at the same angle as the face 7, bearing towards the inner face and terminating at the point 10, the same as the face 9.

The milling or cutting of the various surfaces is so negotiated that the face 3 of the end 1 fits the face 7 of the end 2; the face 5 of the end 1 fits the face 9 of the end 2. The cutting of the two faces 7 and 9 in this particular manner forms a V shaped groove with respect to the inner face of the piston ring. The point 8 of the end 2 abuts the point 6 of end 1 while at the same time the extreme end of the end 2 abuts the point 4 of the end 1.

This special way of cutting the angles of the faces leaves an edge strip 11 extending from the point 6 to the extreme outer end of end 1 which fills the space between the edge 12 and the wall of the piston. A similar edge strip 13 is provided on the lower inner edge of end 1 extending from the point 4 to the extreme end of the end 1, filling the space left between the edge 14 and the inner edge of the piston ring.

Figure 7:
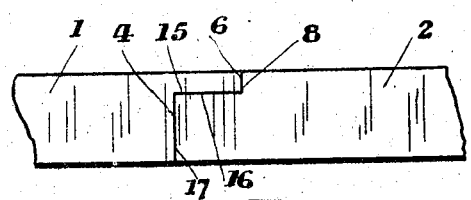
Figure 7 is a front view of the joint when pressed together.

When the ends of the piston ring are forced together as shown in Figure 7, the ends 6 and 8, the lines 15 and 16 and the ends 4 and 17 are all forced together, insuring a tight joint to prevent leakage along these lines. At the same time the ends 6 and 8 and 11 and 12 on the top surface, and the ends 7 and 4 and 14 and 13 on the bottom surface are likewise forced together thereby preventing any leakage along these lines respectively.

When the ends spring away from one another the several surfaces are long enough to accommodate the spring and at the same time prevent any gas from passing from the lower edge past the ring to the upper edge and vice versa.

The faces 3 and 5 form surfaces upon which the faces 7 and 9 are free to slide and at the same time these respective faces are cut so as to form a V shaped mortise and tenon free to slide within one another. By forming these faces at the angle shown the extent of the contacting surfaces is made as great as possible and consequently the resistance to leakage is made as great as possible.

It will of course, be understood that the rings may be made of any diameter, width and thickness desired.

It will be noted that in order to form the tenon or entrant end only two milling or cutting operations are necessary, one to form the face 3 and the other to form the face 5, and in forming the mortise or receiving end only three operations are necessary, one to form the face 7, one to form the face 9 and the third to form continuation of a portion of face 7 to form the recess 8. If a milling tool having an angular cutting edge is used the faces 7 and 9 may both be formed at a single operation.

Having thus described my invention what I claim is:—

1. A piston ring having its tenon end so cut away as to present a relatively long oblique face extending from the lower inner edge of the ring to near the upper outer edge and a relatively short oblique face extending downward and forward from the upper inner edge of the ring and intersecting the relatively long plane about midway between the upper and lower edges to leave the extreme end portion of the ring triangular in cross section, said ring having its mortise end so cut away from the rear as to leave a recess triangular in cross section adapted to receive the triangular portion of the tenon end.

2. In a piston ring having its outer face at its tenon end cut away from its extreme end for a relatively long distance on a plane extending from its inner lower edge to a line parallel with and a substantial distance below its outer upper edge to form a relatively long inclined face, and also cut away from its extreme end for a relatively short distance on a plane oblique to the faces of the ring extending from its inner upper face to intersect the first plane on a line parallel with and midway between the upper and lower edges of the ring in combination with the mortised end of the ring having its inner face cut away from its extreme end to form recesses to receive the end portions on the other end of the ring.

3. In a piston ring having its outer face at its tenon end cut away from its extreme end for a relatively long distance on a plane extending from its inner lower edge to a line parallel with and a substantial distance below its outer upper edge, to form a relatively long inclined face, and also cut away from its extreme end for a relatively short distance on a plane oblique to the faces of the ring extending from its inner upper face to intersect the first plane on a line parallel with and midway between the upper and lower edges of the ring in combination with the mortised end of the ring having its inner face cut away from its extreme end by intersecting planes extending respectively from the upper inner edge and from the lower inner edge to meet on a line parallel with and midway between the upper and lower edges of the ring, the portion below the meeting line being cut away for a relatively short distance on a continuation of the plane extending from the lower inner edge of the ring.

4. The method of forming ends of a piston ring consisting in cutting away the outer face of the tenon end for a substantial distance on a plane oblique to the face of the ring extending from the inner lower edge to a line parallel with and below the outer upper edge, cutting away the portion thus left at the end of the ring for a relatively short distance on a plane oblique to the faces of the ring extending from the upper inner edge of the ring intersecting the first plane on a line midway between the upper and lower edges of the ring and in cutting away the mortised end of the ring for a substantial distance on planes oblique to each other and to the faces of the rings extending respectively from the inner upper edge and the inner lower edge to meet on a line parallel with the faces of the ring and midway between its edges.

5. The method of forming ends of a piston ring consisting in cutting away the outer face of the tenon end for a substantial distance on a plane oblique to the face of the ring extending from the inner lower edge to a line parallel with and below the outer upper edge, cutting away the portion thus left at the end of the ring for a relatively short distance on a plane oblique to the faces of the ring extending from the upper inner edge of the ring intersecting the first plane on a line midway between the upper and lower edges of the ring and in cutting away the mortised end of the ring for a substantial distance on planes oblique to each other and to the faces of the rings extending respectively from the inner upper edge and the inner lower edge to meet on a line parallel with the faces of the ring and midway between its edges and cutting away for a relatively short distance, the end of the lower portion thus left, on a plane continuous with the plane extending from the upper inner edge of the ring.

In testimony whereof I hereunto affix my signature.

LEO R. BEHNKE.